United States Patent
Brzozowski

(10) Patent No.: US 8,265,073 B2
(45) Date of Patent: Sep. 11, 2012

(54) METHOD AND SYSTEM WHICH ENABLES SUBSCRIBERS TO SELECT VIDEOS FROM WEBSITES FOR ON-DEMAND DELIVERY TO SUBSCRIBER TELEVISIONS VIA A TELEVISION NETWORK

(75) Inventor: John Jason Brzozowski, Mt. Laurel, NJ (US)

(73) Assignee: Comcast Cable Holdings, LLC., Philadelphia, PA (US)

( * ) Notice: Subject to any disclaimer, the term of this patent is extended or adjusted under 35 U.S.C. 154(b) by 1352 days.

(21) Appl. No.: 11/545,235

(22) Filed: Oct. 10, 2006

(65) Prior Publication Data

US 2008/0084877 A1 Apr. 10, 2008

(51) Int. Cl.
*H04L 12/28* (2006.01)
(52) U.S. Cl. ............................. 370/389; 370/392; 370/254
(58) Field of Classification Search .................. 370/389, 370/395.2, 254
See application file for complete search history.

(56) References Cited

U.S. PATENT DOCUMENTS

| | | | |
|---|---|---|---|
| 6,058,421 A | 5/2000 | Fijolek et al. | |
| 7,069,325 B1 * | 6/2006 | Lu et al. | 709/226 |
| 7,072,339 B2 | 7/2006 | Tsuchiya et al. | |
| 7,457,253 B2 * | 11/2008 | Ronneke | 370/254 |
| 2002/0032766 A1 * | 3/2002 | Xu | 709/223 |
| 2004/0037316 A1 | 2/2004 | Choi et al. | |
| 2004/0042600 A1 * | 3/2004 | Tripathi et al. | 379/201.12 |
| 2005/0080891 A1 | 4/2005 | Cauthron | |
| 2006/0080424 A1 | 4/2006 | Sun et al. | |
| 2006/0159100 A1 * | 7/2006 | Droms et al. | 370/395.2 |
| 2006/0168517 A1 * | 7/2006 | Itoh et al. | 715/517 |
| 2006/0230120 A1 * | 10/2006 | Yasuda | 709/217 |
| 2007/0015411 A1 * | 1/2007 | Hirata et al. | 439/620.34 |

FOREIGN PATENT DOCUMENTS

EP 1473900 A2 11/2004

OTHER PUBLICATIONS

International Search Report for corresponding PCT Application No. PCT/US07/80787, mailed Apr. 17, 2008, 8 pages.
Volz, Ericsson B, "Load Balancing for DHCPv6 draft-ietf-dhc-dhcpv6-loadb-01.txt", IETF Standard-working-draft, Internet Engineering Task Force, IETF, CH, vol. dhc, No. 1, Jun. 2002.
European Supplementary Search Report for Application No. 07844017.9, dated May 7, 2010.
Canadian Office Action for Application No. 2,666,369 dated Oct. 14, 2010, 3 pages.
Canadian Office Action for application No. 2,666,369 mailed Sep. 27, 2011.

* cited by examiner

*Primary Examiner* — Dang Ton
*Assistant Examiner* — Pamit Kaur
(74) *Attorney, Agent, or Firm* — Banner & Witcoff, Ltd.

(57) ABSTRACT

Provisioning of network element with a provisioning element having a number of provisioning servers. Each provisioning server being active to support its own provisioning and to actively backup the provisioning of the provisioning servers such that operations of the provisioning servers is maximized while providing redundancy in the event that one of the other provisioning servers is lost or disabled.

23 Claims, 1 Drawing Sheet

METHOD AND SYSTEM WHICH ENABLES SUBSCRIBERS TO SELECT VIDEOS FROM WEBSITES FOR ON-DEMAND DELIVERY TO SUBSCRIBER TELEVISIONS VIA A TELEVISION NETWORK

BACKGROUND OF THE INVENTION

1. Field of the Invention

The present invention relates to provisioning network elements, such as but not limited to network elements associated with supporting operations of a cable television system.

2. Background Art

The provisioning of a network element generally includes providing the network element with instructions suitable for use in supporting its interaction with an associated network. This generally includes specifying a network address and operational parameters for the network element. One or both of these pieces of information may be included within provisioning instructions used to facilitate the provisioning process, as one having ordinary skill in the art will appreciate.

Dynamic Host Configuration Protocol (DHCP) is a one protocol commonly employed to facilitate provisioning the network elements. DHCP has evolved over the years to include multiple versions, such as but not limited to DHCPv4 and DHCPv6. One problem with the use of DHCP to provision network elements relates to their dependency on these servers to reliably and consistently furnish provisioning instructions.

The problem mainly pertains to the loss or temporary shutdown of the provisioning servers. Provisioning servers may be responsible for provisioning numerous network elements such that the loss or temporary shutdown of one or more of the provisioning servers may interrupt or prohibit the ability of one or more of the network elements to interact with the associated network. This can be problematic if the network element is critical to client needs and/or otherwise important to any number of possible contingent operating conditions.

One method to address this problem relates to mirroring a primary provisioning server with a backup provisioning server, often referred to as an active-passive model. Should the primary server fail, the backup server may be brought online relatively quickly to cover the provisioning associated with the primary server. While effective, this type of redundancy is costly in that the provider must essentially maintain two fully functional provisioning servers in order to support the same number of network elements that could be similarly supported with a single provisioning server. Additionally, this model allows for limited reliability in the form of a single backup server.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
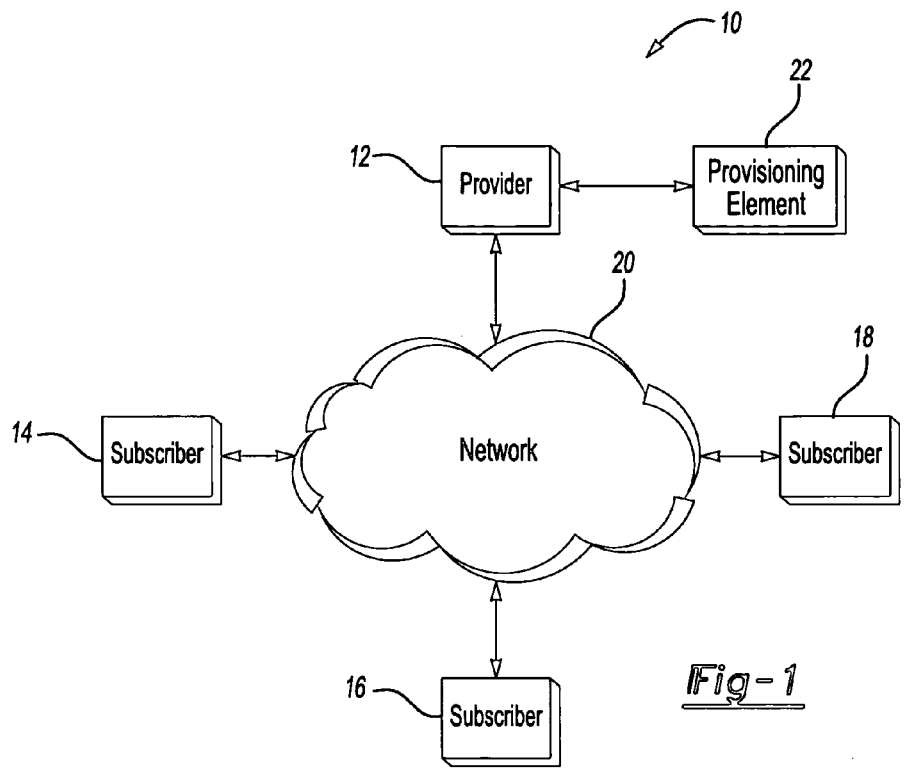
FIG. 1 illustrates a system for providing media content in accordance with one non-limiting aspect of the present invention.

FIG. 1 illustrates a system 10 for providing media content in accordance with one non-limiting aspect of the present invention. The system 10 may include a media provider 12 for providing media services to subscribers at one or more subscriber locations 14-18 and a network 20 for facilitating communications there between.

The media provider 12, for exemplary purposes, is most prominently described with respect to being a cable television service provider having capabilities for providing cable television, telecommunications, and high-speed data services to the subscriber locations, primarily through wireline and/or wireless communications.

The present invention, however, is not so limited and fully contemplates the provider 12 being associated with any type of service provider, including other television providers (IP, broadcast, satellite, etc.) and non-television providers, such as those associated with high-speed data, telecommunications, cellular communications, and the like.

The media provider 12 may be configured to support and/or facilitate the use of any number of television and non-television services and applications, such as, but not limited to, linear and non-linear television programming/signaling (cable, satellite, broadcast, etc.), Video on Demand (VOD), interactive television (iTV), interactive gaming, pay-per-view (PPV), digital video recording (local and remote), and others.

The network 20 may include any number of features and devices to facilitate signal transportation and other operations associated with interfacing the subscriber locations with each other and otherwise supporting communications associated with services of the media provider. The network 20 may include terrestrial and extraterrestrial components and infrastructures, including cable lines, telephone lines, and/or satellite or other wireless architectures. The network 20 may be associated with other private and/or public networks, such as the Internet and dedicated or virtual private networks.

The network 20 may include one or more of network support features, such as a headend, router, hub, switch, gateway, conditional access router (CAR), cable modem terminations system (CMTS), network provisioning unit (NPU), session boarder controller, media gateway, media gateway controller, signaling gateway, call management server, presence server, SIP routing proxy, SIP proxy/registrar server, PCMM policy server, bandwidth on demand server, streaming server caching proxy, gaming server, CDN, media acquisition server, provider server, a unified messaging server, OSS/BSS, global directory server, digital or personal video recorder (DVRs, PVRs), media terminal adapter (MTA), and/or outlet digital adapter (ODA).

Each subscriber location 14-18 may include one or more media devices (not shown) to facilitate user interaction with the media content/services. The scope of such interaction may be based on subscriptions and other parameters set by the media provider. The subscriptions may specify various classes of services and other parameters associated with usage rights and services available to the corresponding subscriber.

The media devices may relate to any number of devices suitable for interfacing and/or facilitating interfacing the subscribers. For example, the media devices may be a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), personal media device, and any other item having capabilities to supporting access to any number of the services.

The media devices may be configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

The system 10 may be used to provide media content to one or more of the subscribers 14-18. The media content may relate to live, on-demand, or other viewing, streaming, and/or broadcasting of signals associated with supporting television programming, movies, audio, and other multimedia, as well as, downloading of clips or full-length versions of the same, all of which for exemplary purposes may be generally referred to as programs.

The content sources may be the media provider 12 (which in turn may receive the content from other sources) and/or one or more of the subscriber devices or other non-subscriber devices connected the network 20. For example, if the media provider 12 is a television service provider, a portion of the media content may relate to television programs, movies, and other multimedia packets. This content may be delivered from the media service provider to the subscribers through streaming, downloading, broadcast, peer-to-peer, and any number of other processes.

The media content may be delivered to the subscriber locations directly from the media service provider and/or from one or more of the other devices in communication therewith. In more detail, as is common with larger media content providers, multiple regional enterprises, such as headend units and the like, may be configured to provide regional programming to a number of subscribers associated therewith. Each of the headends may store various types of media content for distribution to the subscribers it services. Optionally, the headends may be configured to support headend to headend communications such that non-direct subscribers, i.e., those supported by other headends, may similarly receive content from other headends.

In addition, some of the media content may be sourced from the subscribers 14-18, such as by transporting content stored locally on the home networks of the subscribers to other locations within the same home network and/or to other locations beyond the home network that are in communication therewith by way of the network. The media provider may include features and capabilities to facilitate such inter-subscriber communications.

The system may further include a provisioning element 22 to facilitate provisioning the various devices, elements, and features described above with respect to delivering, supporting, or otherwise interfacing services with the subscriber locations 14-18 and/or other devices, elements, and features that may not be described above, such as but not limited to those associated with supporting services associated with non-cable related enterprises. The term 'network element' and/or 'network client' is hereinafter used to generally refer these items. The provisioning element 22, as described below in more detail, may be used to facilitate provisioning the operations associated with the various network elements.

Figure 2:
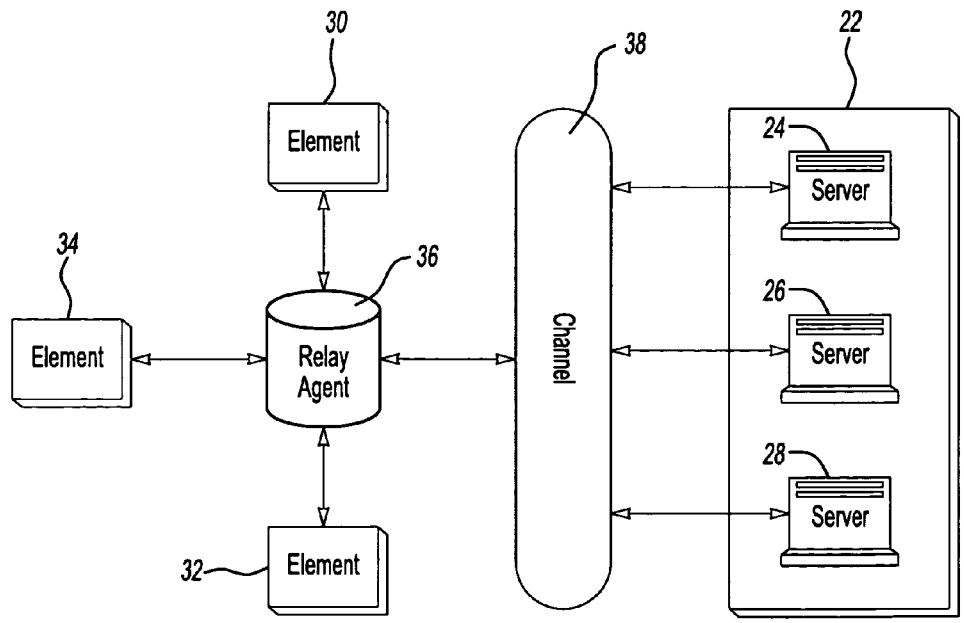
FIG. 2 illustrates the provisioning element in accordance with one non-limiting aspect of the present invention.

FIG. 2 illustrates the provisioning element 22 in accordance with one non-limiting aspect of the present invention. The provisioning element 22 may include two or more provisioning servers 24-28. The provisioning servers 24-28 may be operated in accordance with the present invention to issue provisioning instructions associated with provisioning operations of various network elements 30-34. In this manner, the provisioning element 22 may be used to provision any one or more of the network elements 30-34 according to any number of operating parameters associated with the operation thereof.

The network 20 may be used to facilitate communications between the network elements 30-34 and provisioning element 22. For exemplary purposes, the network elements 30-34 communicate with the provisioning element 22 by way of relay agent 36 configured to forward signals between the network elements 30-34 and the provisioning element 22. Optionally, the relay agent 36 may be configured to communicate with the network elements 30-34 in unicast manner and the provisioning servers 24-28 in a multicast manner.

The provisioning servers 24-28 may be bound to a common channel 38 such that communications between the relay agent 36 and the servers 24-28 are commonly communicated between the relay agent 36 and each of the provisioning servers 24-28. The common channel 38 may be further suitable for use in facilitating communications between the provisioning servers 24-28 themselves such that one server 24-28 may communicate with the other similarly bound servers 24-28. In this manner, the provisioning element 22 may be generally characterized as two or more provisioning servers 24-28 bound together over the common channel 38.

FIG. 2 illustrates multiple network elements 30-34, relay agent 36, and provisioning element 22 for exemplary purposes only and without intending to limit the scope and contemplation of the present invention. The present invention fully contemplates the provisioning element 22 supporting provisioning of any number of network elements 30-34 and the use of multiple provisioning elements 22 and relay agents 36 to support provisioning larger numbers of network elements 30-34. Accordingly, the system 10 may include any number of relay agents 36 and/or groups of provisioning servers 24-28 (provisioning elements 22) to facilitate provisioning any number of the network elements 30-34.

For example, multiple relay agents 36 may be associated with particular groups of network elements 30-34 and assigned to support forwarding signals between the network elements 30-34 and multiple provisioning elements 22 associated with provisioning the same. The relay agents 36 may selectively interface the signals between the network elements 30-34 and provisioning servers 24-28 so as to insure the network elements 30-34 are provisioned by the appropriate group of provisioning servers 24-28. In this manner, the system 10 may include any number of relay agents 36 for relaying provisioning instructional signals between various groups of network elements 30-34 and provisioning servers 24-28.

The provisioning servers 24-28 and relay agent 36 may include capabilities to support Dynamic Host Configuration Protocol (DHCP) provisioning of the network elements, such as but not limited to DHCPv6 related provisioning. This or other protocols may be used by the servers 24-28 and relay agent 36 to provide the network elements 30-34 with instructions suitable for use for use in provisioning the interaction of the network elements with the network or components associated therewith. This may include specifying a network address, operational parameters, and/or other information for the network elements within provisioning instructions used to facilitate the provisioning process.

One or more of the provisioning servers 24-28 associated with the same group of provisioning servers, i.e., those associated with the same provisioning element 22, may be configured to support provisioning any one of the network elements 30-34 supported by the other provisioning servers 24-28 in the group. In this manner, each provisioning servers 24-28 may provide active redundancy to the other provisioning servers so as to support provisioning in the event that one of the primary servers is offline, down, or otherwise unable to support it provisioning operations.

One or more of the provisioning servers 24-28 associated with the same group of provisioning servers 24-28 may also all be simultaneously active and operational with respect to provisioning so that the provisioning demands required to supported the associated network elements 30-34 can be distributed amongst each of the servers 24-28. With each provisioning server 24-28 being active and having the capabilities to support operations of the other provisioning servers 24-28, the present invention is able to maximize provisioning capabilities and scale while also offering enhanced reliability. This allows the present invention to improve provisioning capabilities relative to the above described provisioning systems that utilized an offline, mirroring system to provide backup services.

Provisioning related messages from the network elements 30-34 may be transmitted to each provisioning server 24-28 bound to the common channel 38 (different groups of provisioning servers are bound to a common channel associated with that group such that each group is associated with a different common channel), offering each provisioning server 24-28 the opportunity to process the messages. Processing of the messages by the respective servers 24-28 may depend on the configuration of the server(s) 24-28. In one non-limiting aspect of the present invention, each server 24-28 may either have an identical or minimally overlapping configuration particularly for network information to facilitate address assignment and/or operational parameter information to facilitate configuration where DHCPv6 is employed. Rudimentary scalability may also result from the configuration above. Without some form of inter-DHCPv6 server communication the scalability of DHCPv6 services may not be linear or balanced but nonetheless scaleable.

For improved scalability and redundancy, each server 24-28 in a set or cluster may be able to share and exchange some basic information about its state with every other server 24-28 in the set or cluster. Approaches to balancing the load of provisioning servers, specifically DHCPv6 servers, may include the adoption of existing load balancing algorithms, specifications, or the creation of new algorithms and/or specifications. Load balancing algorithms may specify an alternative to standardized communications between the servers 24-28 specifically to address load balancing concerns. Every server 24-28 that is part of the set or cluster (bound to a common communications channel) providing redundant and scalable DHCPv6 services may implement an algorithm and/or specification in order to maximize the opportunity for load balancing and scalability. Every server 24-28 may be able to intercommunicate with every other server 24-28 bound to the common communications channel. Leveraging the inherent behavior of the DHCPv6 protocol in conjunction with a load balancing algorithm and specification to facilitate inter-DHCPv6 server communications is the foundation for providing scaleable, load-balanced, and redundant DHCPv6 services.

Each relayed, or forwarded DHCPv6 message or request, may be processed by at least one server 24-28 located or bound to a common communications channel (or local multicast group). DHCPv6 servers 24-28 that have implemented a load balancing algorithm may govern exactly which server will ultimately process and respond to the message or request to actively control the distribution of provisioning requests. By definition the DHCPv6 protocol allows for multiple responses to be sent in reply to a single request or message sent by a DHCPv6 client. The requesting network element 30-34 ultimately makes the determination as to which IP lease offer it will accept.

Typically, the first lease received by a network element sent by one or more servers 24-28 is that which is accepted. In general when DHCPv6 Rapid Commit is not employed (or the full four message exchange is required or forced) only one server will be authoritative for a given IP (IPv6) lease. Requests that utilize Rapid Commit are initiated or signaled by the network element, however, a server 24-28 ultimately decides whether Rapid Commit will be used for address assignment and can force the use of the full DHCPv6 four message exchange.

Additionally, the use of multicast, or a common communications channel, by DHCPv6 can be leveraged to further enhance DHCPv6 services by making the same dynamically scaleable and redundant. Since each server 24-28 binds locally to the DHCPv6 multicast group each server added locally to the same can participate collectively in responding to a variety of DHCPv6 requests. The multicast nature of DHCPv6 in conjunction with the use of a load balancing algorithm allows each DHCPv6 server 24-28 bound to a given multicast group to actively participate in providing DHCPv6 services providing redundancy and scale. Redundancy is effectively provided because each DHCPv6 server bound to the same multicast group will be able to handle the processing of any and all DHCPv6 messages received. Scalability can be augmented by simply adding additional servers 24-28 to a given multicast group. Each additional server 24-28 bound to a multicast group will introduce another server 24-28 that can be used to further balance load and positively affecting performance and reliability.

A 64-bit EUI-64 address defined by the Institute of Electrical and Electronic Engineers (IEEE) may be assigned or derived from IEEE 802 addresses for assignment to the network elements 30-34. An EUI-64 approach to generating addresses can also be leveraged when dynamically assigning IPv6 addresses to network elements using DHCPv6. Incorporating an EUI-64 approach to generating addresses into the DHCPv6 servers facilitates providing redundant and scaleable DHCPv6 services. Essentially an EUI-64 approach to generating addresses incorporates the 48 bit MAC address of the network elements 30-34 interface in the generation of its unique 64 bit interface ID. Since the 48 bit MAC address is used to generate the interface ID it is unlikely that any two devices will be offered the same IPv6 address when EUI-64 is employed when generating unique interface IDs for a given prefix within an IPv6 network or deployment.

Furthermore, EUI-64 allows for the uniform assignment of IPv6 addresses by the servers 24-28 since all servers 24-28 configured to use the same will employ the same methodology or algorithm for generating addresses to be dynamically allocated. In short, any server 24-28 bound to the common communications channel or same local multicast group for DHCPv6 and sharing a similar or overlapping configuration will essentially be able to offer the same IPv6 address and/or operational parameters to any one DHCPv6 client request with little to no fear of duplicate address assignment. In the event that one or more of the original issuing server(s) 24-28 is unavailable or unable to respond to client requests any other available server (that is part of the same provisioning group) will be able to seamlessly satisfy DHCPv6 client requests. In situations where EUI-64 is being leveraged to facilitate redundant DHCPv6 services and an error conditions occurs the DHCPv6 server actively responding to network element requests will likely not have knowledge of prior activity for the client. This is in and of itself not problematic and will not affect the ability of the server(s) to assign IP addresses and/or operational parameters.

As the above illustrates, DHCPv6 and other technologies can be innovatively applied to provide redundant, scaleable DHCPv6 services. Furthermore, these services may be provided without the adoption existing or creation of new protocols and technology reducing the time and effort required to offer redundant, scaleable DHCPv6 services. This document also does not preclude the use of additional DHCPv6 attributes and configurations that could further enhance providing such services.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A provisioning method, comprising:
persistently issuing provisioning instructions from at least one of a number of provisioning servers configured to receive a provisioning request for a network element; and
persistently reissuing the provisioning instructions from one or more different provisioning severs in response to one or more subsequent provisioning requests being received by the one or more different provisioning servers such that the network element is persistently reissued the provisioning instructions simultaneously from different provisioning servers,
wherein the provisioning instructions include a network address for the network element such that the same network address is issued with each reissuing of the provisioning instructions.

2. The method of claim 1 further comprising determining the network address as function of a unique network identification (ID) associated with the network element.

3. The method of claim 2 further comprising configuring each provisioning server to determine the same network address when reissuing the provisioning instructions so that the same network address is associated with the network element regardless of the provisioning server providing the provisioning instructions.

4. The method of claim 3 further comprising the provisioning servers generating the network address without prior knowledge of the network address previously issued to the network element and without requiring communication of the network address from the provisioning server that previously issued the network address.

5. The method of claim 1 further comprising defining the network address according to parameters specified in Internet Protocol version 6(IPv6).

6. The method of claim 1 further comprising limiting transmission of the provisioning request to provisioning servers bound to a common channel such that only provisioning servers bound to the common channel issue the provisioning instructions.

7. The method of claim 6 further comprising limiting subsequent provisioning request to the common channel associated with the initial provisioning request such that only provisioning servers bound to the common channel are able to reissue the provisioning instructions.

8. The method of claim 6 further comprising communicating the provisioning request to a relay agent, and
the relay agent facilitating transmission of the request to the provisioning servers bound to the common channel.

9. The method of claim 1 further comprising executing a load balancing process for each provisioning request, the load balancing process determining the provisioning server responsible for reissuing the provisioning instructions such that only one provisioning server out of the number of provisioning servers receiving the provisioning request reissues the provisioning instructions.

10. The method of claim 1 further comprising issuing the provisioning instructions from multiple provisioning servers for each provisioning request and requiring the network element to discriminated between the reissued provisioning instructions.

11. The method of claim 1 further comprising issuing the provisioning instructions according to parameters specified in Dynamic Host Configuration Protocol version 6(DHCPv6).

12. The method of claim 1 further comprising mirroring provisioning server operational parameters across each provisioning server receiving the provisioning request, the provisioning server operating parameters defining operating parameters for each provisioning server that are sufficient to enable each provisioning server to reissue the provisioning instructions without knowledge of previously issued provisioning instructions.

13. The method of claim 1 further comprising adding one or more new provisioning servers such that the new servers receive the provisioning requests and requiring the new provisioning servers to reissue the same provisioning instructions as the other servers receiving the provisioning requests.

14. A system for network services comprising:
a plurality of servers, each of the servers being in communication with a communication network and active; and
wherein the plurality of servers are bound to a channel over which each of the plurality of servers can communicate with at least one network element;
wherein the plurality of servers are configured to persistently reissue provisioning instructions to the at least one network element in response to receiving a message from the network element such that the network element is persistently reissued the provisioning instructions simultaneously from different provisioning servers; and
wherein each provisioning instruction includes a network address for the network element within the provisioning instructions such that the same network address is issued with each reissuing of the provisioning instructions.

15. A system as set forth in claim 14, wherein the channel is a multi-cast channel.

16. A system as set forth in claim 15, wherein the channel is a DHCPv6 channel.

17. A system as set forth in claim 14, wherein the servers transmit a message in response to the message from the network element.

18. A system as set forth in claim 14, wherein the plurality of servers are in communication with each other.

19. A system comprising:
a provisioning element comprising multiple provisioning servers, wherein each of the provisioning servers is concurrently active; and
a relay agent in communication with the provisioning element via a common channel to which the relay agent and each provisioning server is bound, wherein the relay agent is further in communication with a plurality of network elements to be provisioned by the provisioning element, and wherein the relay agent is configured to communicate with the provisioning servers using multicast communications, and the relay agent is configured to communicate with each network element using unicast communications,
wherein upon receiving a provisioning request from a first network element, at least two of the multiple provisioning servers are configured to simultaneously provide redundant provisioning data to the first network element, and
wherein said provisioning data includes a network address for the network element within the provisioning instructions such that the same network address is issued with each reissuing of the provisioning instructions.

20. The system of claim 19, wherein the network address comprises an IPv6 network address generated based on a MAC address of the first network element.

21. The system of claim 19, wherein the provisioning data comprises an operational parameter.

22. The system of claim 19, wherein the provisioning data is provided in one or more DHCP messages.

23. The system of claim 14, further comprising:
a network element, configured to simultaneously receive and process persistent provisioning instructions from different ones of the provisioning servers.

* * * * *

UNITED STATES PATENT AND TRADEMARK OFFICE
CERTIFICATE OF CORRECTION

| | | |
|---|---|---|
| PATENT NO. | : 8,265,073 B2 | Page 1 of 1 |
| APPLICATION NO. | : 11/545235 | |
| DATED | : September 11, 2012 | |
| INVENTOR(S) | : John Jason Brzozowski | |

It is certified that error appears in the above-identified patent and that said Letters Patent is hereby corrected as shown below:

On the Title Page and in the specification, Column 1, line 1, Title, delete "Method and System Which Enables Subscribers to Select Videos from Websites for On-Demand Delivery to Subscriber Televisions via a Television Network"

and insert the Title --Provisioning Network Elements--

Signed and Sealed this
Sixteenth Day of July, 2013

Teresa Stanek Rea
*Acting Director of the United States Patent and Trademark Office*